United States Patent [19]
Lambert et al.

[11] Patent Number: 5,186,598
[45] Date of Patent: Feb. 16, 1993

[54] RETRACTABLE ARM LOADING/UNLOADING DEVICE AND VEHICLE COMPRISING SAME

[75] Inventors: Bernard Lambert, Pierreclos; Alain Jochum, Saint-Etienne, both of France

[73] Assignee: Bennes Marrel, Cedex, France

[21] Appl. No.: 313,751

[22] Filed: Feb. 22, 1989

[30] Foreign Application Priority Data

Feb. 24, 1988 [FR] France .................. 88 02244

[51] Int. Cl.⁵ .............................................. B60P 1/48
[52] U.S. Cl. .................................... 414/498; 414/546
[58] Field of Search ............... 414/498, 500, 499, 555, 414/467, 546, 491, 547

[56] References Cited

U.S. PATENT DOCUMENTS

| 2,501,112 | 3/1950 | Webster | 414/547 |
| 4,290,726 | 9/1981 | Sutela et al. | 414/546 X |

FOREIGN PATENT DOCUMENTS

| 107326 | 5/1984 | European Pat. Off. | 414/546 |
| 2550763 | 5/1977 | Fed. Rep. of Germany | |
| 3037840 | 4/1981 | Fed. Rep. of Germany | 414/546 |
| 3312557 | 10/1984 | Fed. Rep. of Germany | 414/498 |
| 2294877 | 7/1976 | France | |
| 2442213 | 6/1980 | France | |
| 2540804 | 8/1984 | France | 414/498 |
| 2549785 | 2/1985 | France | 414/546 |
| 39212 | 3/1977 | Japan | 414/546 |

*Primary Examiner*—Frank E. Werner
*Attorney, Agent, or Firm*—Remy J. VanOphem

[57] ABSTRACT

A lifting device designed to be mounted on the chassis of a vehicle for loading and unloading the vehicle having a first arm designed to be articulated at least indirectly to the chassis of the vehicle and, attached to the first arm, a second arm normally perpendicular to the first arm ending with a hook for grasping an upper part of the load. The second arm is retractable and is formed by a first section attached to the first arm and a second section carrying the hook, movable relative to the first section between a retracted configuration and a working configuration, at least one pair of complementary locking members being provided for locking the second section in its working configuration.

10 Claims, 2 Drawing Sheets

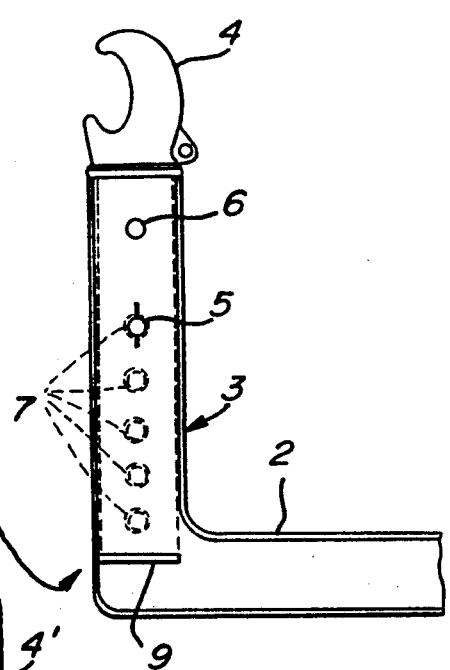
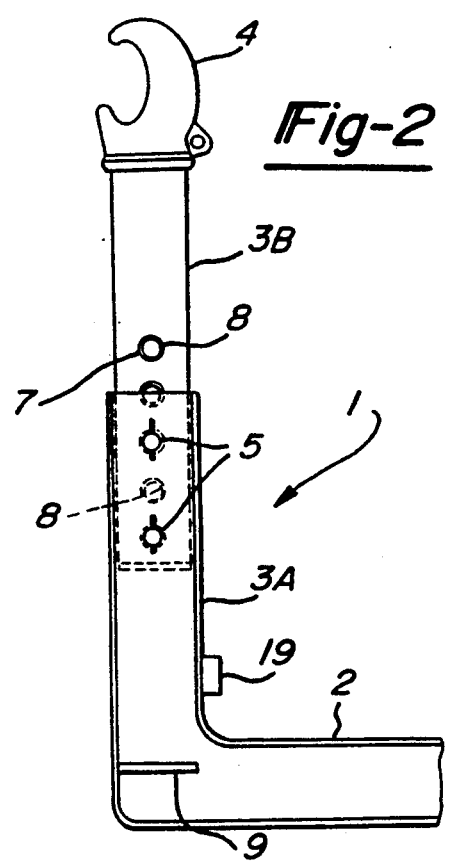
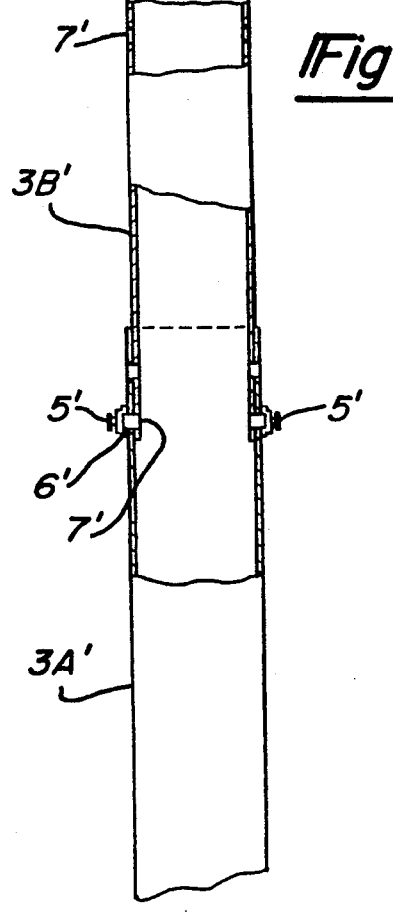
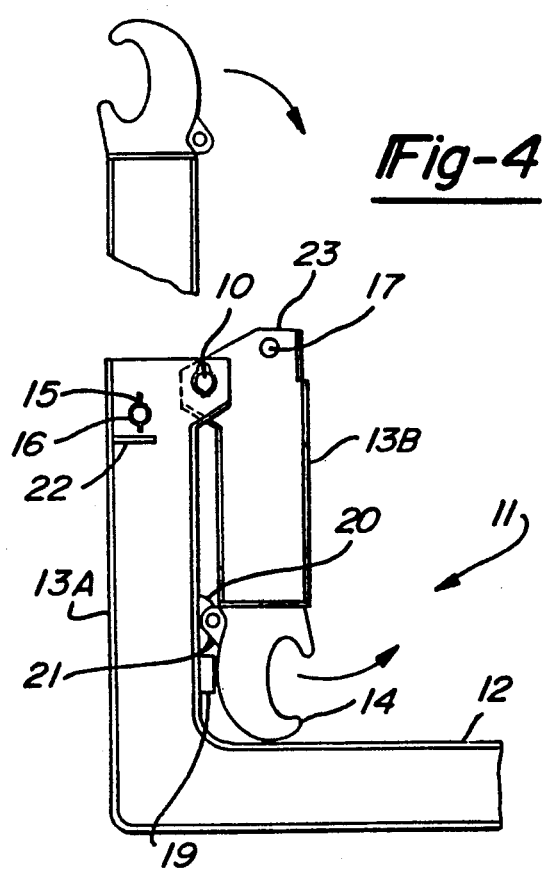

RETRACTABLE ARM LOADING/UNLOADING DEVICE AND VEHICLE COMPRISING SAME

BACKGROUND OF THE INVENTION

The invention concerns a lifting device designed to be mounted on the chassis of a vehicle for loading and unloading the vehicle.

In a known way, the lifting device includes a first arm designed to be articulated to the chassis of the vehicle and, attached thereto, a second arm normally perpendicular to the first arm and ending in a hook for grasping a load.

In a loading configuration the first arm is horizontal and the second arm is vertical.

An arm of this kind is generally designed to engage a ring provided at the top of a load with its hook. The arm, therefore, usually has a length which is slightly less than the height of the load.

These lifting devices are generally mounted on trucks with a cab at the front and in the loading configuration the second arm is disposed behind the cab, above which it sometimes projects.

In order to reduce the overall dimensions of trucks of this kind, in particular for storing them (or to have them adopt a standardized so-called "airborne" format), it has already been proposed to make the upper part of the cab retractable, but projection of the second arm of the lifting device above the cab still remains a problem.

An object of the invention is to alleviate the problem of the second arm extending above the height of the cab of known lifting devices by proposing an adjustable height vertical arm lifting device.

SUMMARY OF THE INVENTION

A lifting device designed to be mounted on the chassis of a vehicle for loading and unloading the vehicle is proposed which has a first arm adapted to be articulated at least indirectly to the chassis of the vehicle and, attached to the first arm, a second arm normally perpendicular to the first arm and ending with a hook for grasping an upper part of the load, of the kind including a retaining tongue, the second arm being adapted to be disposed vertically in a rest configuration of the lifting device in which the first arm is horizontal, characterized in that the second arm is retractable and is formed by a first section attached to the first arm and a second section carrying the hook, relative to the first section between a retracted configuration in which the major part of the length of the second section lies within the length of the first section and a working configuration in which the major part of the length of the second section forms an extension of the first section. At least one pair of complementary locking members are provided for locking the second section into its working configuration, and the lifting device is operational only in the working configuration.

It will be understood that the invention is derived from a new technical problem and proposes the separation of the arm into two parts.

The invention is applicable to all types of prior art lifting devices, whether the second arm is rigidly joined to the first arm or joined to it by an articulation with limited angular movement.

In preferred embodiments of the invention, some of which may be combined with each other the second section is slidably mounted in the first section and a locking member on the first section is adapted to cooperate with separate complementary members on the second section to lock the latter into respective positions, adapted to cooperate with separate complementary members on the second section to lock the latter into respective Two locking members are provided on the first section for locking the second section into respective positions.

The second section is articulatable relative to the first section and also about an axis perpendicular to the first and second arms so as to pivot in the plane of the arms within the angle defined thereby.

A first pair of complementary locking members is provided near the articulation between the first and second sections and a second pair of complementary locking members is provided near the opposite ends of the first and second sections. The pair of complementary locking members includes a pin carried by one section and a hole in the other section formed by a reinforcing tube passing therethrough.

Objects, characteristics and advantages of the invention will emerge from the following description given by way of non-limiting example with reference to the drawings appended thereto.

BRIEF DESCRIPTION OF THE DRAWINGS

FIG. 1 is a partial side view of a lifting device in accordance with the invention in a retracted configuration;

FIG. 2 is a view of a lifting device in its working configuration;

FIG. 3 is a partial view in longitudinal cross-section of a similar lifting device in an alternative embodiment;

FIG. 4 is a partial side view of a lifting device in yet another embodiment, in a retracted configuration, with the hook shown separately in the position it would occupy in a working configuration;

DETAILED DESCRIPTION OF THE PREFERRED EMBODIMENT

Figure 5:
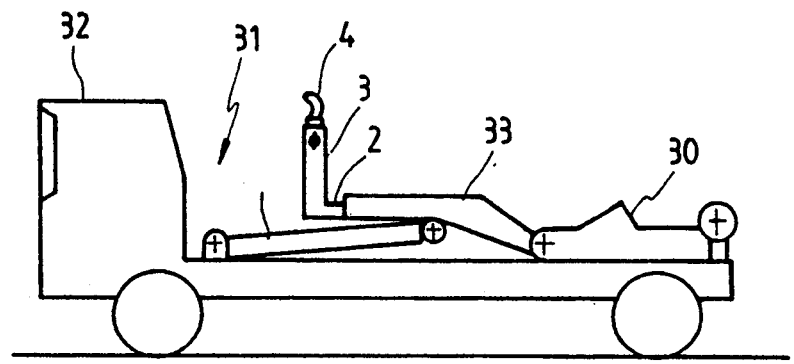
FIG. 5 is a schematic view in elevation of a truck equipped with a lifting device of the type shown in FIGS. 1 and 2, with the second arm shown in a retracted configuration.

A lifting device 1 partially shown in FIGS. 1 and 2 includes a first arm 2 and fixed rigidly thereto at right angles a second arm 3 extending upwards and ending at the top in a hook 4, of the kind including a retaining tongue, for lifting a load situated above the first arm.

The second arm 3 is subdivided into a first section 3A joined to the first arm and a second section 3B carrying the hook 4 and adapted to slide in the first section 3A between a retracted position (FIG. 1) and a working position (FIG. 2) in which the hook 4 is adapted to grasp the ring provided at the top of a load (not shown) such as a container, a skip or a platform provided at its forward end with an upward extension. The height of the hook 4 relative to the first arm is standardized in compliance with DIN and AFNOR standards.

Complementary members are provided on the first and second sections 3A and 3B for locking them in their working position when the lifting device is in its operational configuration.

In the preferred embodiment, the complementary members are a pin 5 adapted to maintain holes 6 in the first section 3A and holes 7 in the second section 3B in alignment, the holes 7 being advantageously in the form of reinforcing tubes 8 passing through the second section.

Two alignment holes 6 are provided in the embodiment illustrated in FIG. 2 the simultaneous use of two pins 5 in the extended second section 3B.

Two or even three holes 7 are provided so that the second section 3B can be locked by the pin when the second section 3B is in the retracted position as shown in FIG. 1.

In this instance there are five holes 7, the distance between which is one-half the axial distance between the holes 6. This provides for at least one intermediate position.

An abutment plate 9 is provided at the base of the first section 3A to locate the second section 3B in the retracted position with the holes 6 and 7 aligned.

FIG. 3 shows an alternative embodiment in which component parts corresponding to those of FIGS. 1 and 2 are designated by the same reference numbers with a "prime".

The complementary locking members are in this instance spring-loaded pins 5' carried by the first section 3A' adapted to maintain in alignment holes 6' and 7' in the first section 3A' and in the second section 3B', respectively.

A lifting device 11 including a first arm 12 and a second arm 13 carrying a hook 14 of the kind including a retaining tongue is illustrated in FIG. 4. The lifting device is formed by a first section 13A to which there is articulated about an axis 10 a second section 13B adapted to pivot in the plane of the arms 12 and 13 so that in a retracted configuration the hook 14 is near the intersection of the first arm 12 and the first section 13A.

The hook 14 advantageously lies against a buffer 19 provided as an abutment for a load at the end of loading.

The second section 13B is locked lengthwise relative to the first section 13A by two apertured lugs 20 and 21 on the sections 13A and 13B, respectively, adapted to lie side by side in a folded configuration and to be maintained in that configuration by a pin (not shown).

Near the articulation axis 10 are holes 16 and 17 in the first and second sections, respectively, adapted to be aligned when the first and second sections are in an extended, working configuration and to be held in that configuration by a pin 15.

An abutment plate 22 is provided to abut an edge 23 of the second section 13B; in its working when the lifting device is configuration.

Figure 6:
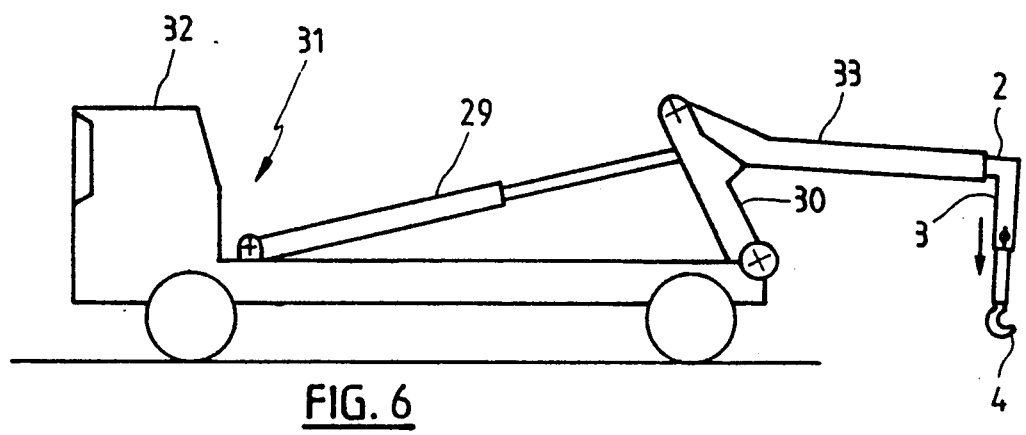
FIG. 6 is a view similar to FIG. 5 in which the lifting device is shown in an unloading position.
Figure 7:
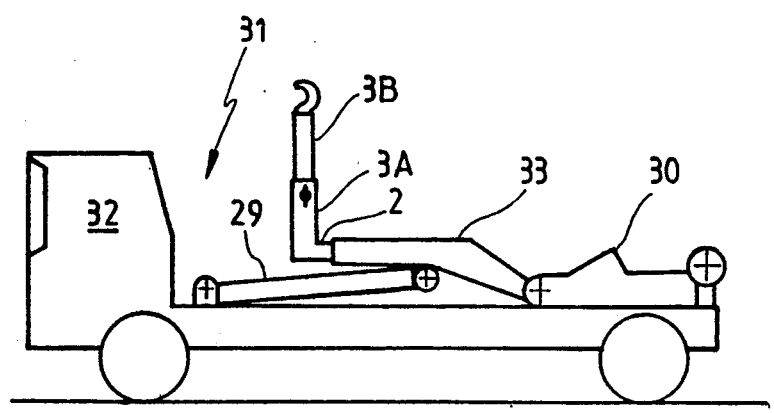
FIG. 7 is a view of the lifting device in which the second arm is shown in unloading position.

As will be clear from FIGS. 5 through 7, the manipulation of the second arm of a lifting device of this kind between position when the lifting device is not in service and the working position when the lifting device is operational can be achieved by gravity without effort.

To extend arm 3 all that is needed is for a ram 29 to swing towards the rear of the first arm 2 together with a subframe 30 to which it is articulated and which is itself articulated at the rear to the chassis of a truck 31 which includes a cab 32.

In this instance the first arm 2 is mounted telescopically in a guide rail 33.

Provided that the complementary locking members are disconnected it will be understood that the second section of the arm 3 is extended by gravity alone as shown by the arrow in FIG. 6. It is then sufficient to replace the pin 5 to lock the arm. By moving the lifting device towards the front the arm 3 goes to the loading configuration. When the position shown in FIG. 6 is reached, a load can be grasped by means of the hook 4.

Starting from the FIG. 6 configuration, the arm 3 can be returned to the retracted configuration of FIG. 5, provided that the locking members are released beforehand.

The same explanations apply to the embodiment of FIG. 4.

It is obvious that the preceding description has been given by way of non-limiting example only and that numerous variations thereon may be proposed by those skilled in the art without departing from the scope of the invention.

We claim:

1. A lifting device designed to be mounted along a central longitudinal axis of a chassis of a vehicle for loading a load onto said vehicle and unloading said load from said vehicle, said lifting device comprising a first arm adapted to be articulated at least indirectly to the chassis of said vehicle and a second arm attached to said first arm, said second arm normally being perpendicular to said first arm and having a hook at its end for grasping an upper part of said load, said second arm being disposed vertically in a rest configuration of said lifting device, said second arm having a first section attached to said first arm and a second section having said hook at its end opposite said first section, said first section having a first longitudinal central plane, said second section having a second longitudinal central plane, said second longitudinal central plane of said second section being substantially planar with said first longitudinal central plane of said first section during a working configuration in which a major part of the length of said second section becomes an extension of said first section, said second section further being uninfluenced by any external force other than gravity and having a major part of its length lying within a length of said first section at said rest configuration whereby movement of said lifting device from said rest configuration to said working configuration causes said second section to freely move uninfluenced by any force other than gravity from said rest configuration wherein a major part of said length of said second section lies within said length of said first section to said working configuration wherein said second section becomes an extension of said first section of said second arm; and at least one pair of complementary locking members associated with said first and second sections for locking said second section to said first section in its extended working configuration, said lifting device being operational to lift said load only when said second arm becomes an extension of said first arm and is positioned and locked to said first arm in said working configuration.

2. The lifting device accoridng to claim 1 wherein said second section is articulated to said first section.

3. The lifting device according to claim 2 wherein said second section is articulated about an axis perpendicular to said first arm and to said first section of said second arm so as to pivot in a plane defined by said first section and said first arm.

4. The lifting device according to claim 2 wherein said at least one pair of complementary locking members comprises a first pair of complementary locking members provided near said articulation between said first and second sections and a second pair of complementary locking members provided near opposite ends of said sections.

5. The lifting device according to claim 1 wherein said at least one pair of complementary locking members comprises a pin carried by one of said first and second sections and a hole in the other of said first and second sections.

6. The lifting device according to claim 5 wherein said pin is carried by said first section and said hole is formed by a reinforcing tube passing through said second section.

7. A transport vehicle comprising a chassis on which is mounted a lifting device for loading a load onto said vehicle and unloading said load from said vehicle, said lifting device comprising a first arm adapted to be articulated at least indirectly to said chassis of said vehicle and a second arm attached to said first arm, said second arm normally being perpendicular to said first arm and having a hook provided at its free end for grasping an upper part of said load, said second arm being disposed vertically in a rest configuration of said lifting device, wherein said second arm comprises a first section attached to said first arm, said first section having a first longitudinal central plane and a second section having said hook at its free end and said second section having a second longitudinal central plane, said second longitudinal central plane of said second section being substantially planar with said first longitudinal central plane of said first section during a working configuration in which said second section becomes an extension of said first section, said second section further being uninfluenced by any external force other than gravity and having a major part of its length lying within a length of said first section at said rest configuration whereby movement of said lifting device from said rest configuration to said working configuration causes said second section to freely move uninfluenced by any force other than gravity from said rest configuration wherein a major part of said length of said second section lies within said length of said first section to said working configuration wherein said second section becomes an extension of said first section of said second arm; and
at least one pair of complementary locking members associated with said first and second sections for locking said second section to said first section in its extended working configuration, said lifting device being operational to lift said load only when said second arm becomes an extension of said first arm and is positioned and locked to said first arm in said extended working configuration.

8. The lifting device according to claim 1 wherein said second section is slidably mounted in said first section.

9. The lifting device according to claim 8 further comprising a common locking member on said first section and separate complementary members on said second section, said common locking member and said separate complementary members cooperating to lock said second section in said working configuration.

10. The lifting device according to claim 9 further comprising two locking members provided on said first section for locking said second section in said working configuration.

* * * * *

UNITED STATES PATENT AND TRADEMARK OFFICE
CERTIFICATE OF CORRECTION

PATENT NO. : 5,186,598
DATED : February 16, 1993
INVENTOR(S) : Lambert et al

It is certified that error appears in the above-indentified patent and that said Letters Patent is hereby corrected as shown below:

Column 1, line 45, before "relative" insert ---- mobile ----.

Column 2, lines 3 through 5 delete in their entirety and insert ---- tions. ----.

Column 3, line 8, after "2" insert ---- to enable ----.

Column 3, line 51, delete "in its working".

Column 3, line 52, after "is" insert ---- in its working ----.

Column 3, line 55, after "between" insert ---- the retracted ----.

Column 4, line 57, delete "accoridng" and insert ---- according ----.

Signed and Sealed this

Twenty-eighth Day of December, 1993

Attest:

BRUCE LEHMAN

*Attesting Officer*   *Commissioner of Patents and Trademarks*